US009565871B2

(12) United States Patent
Tsumuraya et al.

(10) Patent No.: US 9,565,871 B2
(45) Date of Patent: Feb. 14, 2017

(54) METHOD OF MANUFACTURING GRAIN FLOUR

(75) Inventors: Yoichi Tsumuraya, Saitama (JP); Kaoru Kawashima, Saitama (JP); Yoshikazu Shoji, Saitama (JP)

(73) Assignee: NATIONAL UNIVERSITY CORPORATION SAITAMA UNIVERSITY, Saitama-shi, Saitama (JP)

( * ) Notice: Subject to any disclaimer, the term of this patent is extended or adjusted under 35 U.S.C. 154(b) by 86 days.

(21) Appl. No.: 13/881,816

(22) PCT Filed: Oct. 25, 2011

(86) PCT No.: PCT/JP2011/074539
§ 371 (c)(1),
(2), (4) Date: Apr. 26, 2013

(87) PCT Pub. No.: WO2012/057129
PCT Pub. Date: May 3, 2012

(65) Prior Publication Data
US 2013/0323391 A1 Dec. 5, 2013

(30) Foreign Application Priority Data
Oct. 27, 2010 (JP) ................................. 2010-241161

(51) Int. Cl.
A23L 7/10 (2016.01)
B02C 9/00 (2006.01)
B02C 11/08 (2006.01)
A23L 1/10 (2006.01)
A21D 13/04 (2006.01)
A21D 2/26 (2006.01)

(52) U.S. Cl.
CPC ............. *A23L 1/1041* (2013.01); *A21D 2/265* (2013.01); *A21D 13/04* (2013.01); *A23L 7/109* (2016.08); *A23L 7/198* (2016.08); *B02C 9/00* (2013.01); *B02C 11/08* (2013.01)

(58) Field of Classification Search
CPC ............ A23L 7/198; B02C 9/00; B02C 11/08
See application file for complete search history.

(56) References Cited

U.S. PATENT DOCUMENTS

| 6,083,547 | A | 7/2000 | Katta et al. | |
| 2006/0228461 | A1* | 10/2006 | Morgan | 426/618 |
| 2009/0311376 | A1* | 12/2009 | Rao et al. | 426/28 |
| 2010/0112167 | A1* | 5/2010 | Chatel et al. | 426/458 |
| 2010/0316765 | A1* | 12/2010 | French | A21D 6/006 426/28 |

FOREIGN PATENT DOCUMENTS

| CN | 101005770 A | 7/2007 | |
| EP | 459551 A1 * | 12/1991 | ............. A21D 6/00 |
| EP | 0606080 A1 | 7/1994 | |
| JP | H04-11197 B2 | 2/1992 | |
| JP | H06-83652 B2 | 10/1994 | |
| JP | H07-250638 A | 10/1995 | |
| JP | H09-172974 A | 7/1997 | |
| JP | H11-225706 A | 8/1999 | |
| JP | 2006-075060 A | 3/2006 | |
| JP | 2006-247526 A | 9/2006 | |
| JP | 2007-204699 A | 8/2007 | |
| JP | 2007-522081 A | 8/2007 | |
| JP | 2008-118943 A | 5/2008 | |
| JP | 2009-039043 A | 2/2009 | |
| JP | 2010-051286 A | 3/2010 | |
| JP | 2010-110296 A | 5/2010 | |
| KR | 20020037902 A | 5/2002 | |

OTHER PUBLICATIONS

"Mesh and Micron Comparison Chart". Available from netafim.com, as of Sep. 22, 2014. p. 1.*
"Postprandial lipid, glucose, insulin, and cholecystokinin responses in men fed barley pasta enriched with beta-glucan". Am J Clin Nutr, 1999; 69;55-63.*
Machine translation of JP 2006-247526 to Varie Japan Inc. Publication date Sep. 21, 2006. pp. 1-12.*
Glass, Juliet. "The Skinny on Whole Wheat Pasta". Available online from www.weightwatchers.com as of Jan. 10, 2007. pp. 1-2.*
Hazen, Cindy. "High-Fiber Grains". Published on foodproductdesign.com as of Aug. 4, 2009. pp. 1-2.*
"Baking with oat flour". Available online as of Feb. 15, 2010 from selfreliantsisters.blogspot.com. pp. 1-3.*
"Veganzyme—Digestive Enzymes Supplement" from Natural News Store, available as of Apr. 22, 2015 from store.naturalnews.com. pp. 1-5.*
Office Action issued Nov. 1, 2013 in CN Application No. 201180052003.4.

(Continued)

*Primary Examiner* — Jenna A Watts
(74) *Attorney, Agent, or Firm* — Panitch Schwarze Belisario & Nadel LLP

(57) ABSTRACT

A grain flour includes milled grains of at least one grain selected from the group consisting of barley and oat. In the grain flour, the average grain diameter is in the range of 40-100 μm. The content of grains having a grain diameter less than 20 μm is not greater than 20 mass %, the content of grains having a grain diameter in the range of 20-100 μm is in the range of 20-60 mass %, the content of grains having a grain diameter greater than 100 μm and not greater than 500 μm is in the range of 20-60 mass %, and the content of grains having a grain diameter greater than 500 μm is not greater than 5%. An application food using the grain flour is produced from a starting material which contains at least 5% of the grain flour. A method for producing the grain flour is also provided.

4 Claims, 3 Drawing Sheets

(56) References Cited

OTHER PUBLICATIONS

Office Action issued Jun. 20, 2014 in CN Application No. 201180052003.4.
Observations by a third party submitted Apr. 15, 2014 in JP Application No. 2010-241161.
Office Action issued Apr. 22, 2014 in JP Application No. 2010-241161.
West Co. Ltd., Micro Powder, Water-Cooled Stone Mortar-Type Mill Capable of Controlling Frictional Heat with Water during Milling, retrieved on Apr. 4, 2014.
Monta Oda, et al., Men no Hon (A Book of Noodles), Shokuhin Sangyo Shimbunsha Co., Ltd., Dec., 1982, 2nd ed., pp. 52-57.
Toshio Igarashi, Yogashi Seiho Daizenshu (Complete Western Confectionery Works) (vol. 1), Numata Shoten, Jan. 5, 1975, 7th ed., p. 34.
Wu et al, "Enrichment of beta-glucan in Oat Bran by Fine Grinding and Air Classification," Lebensmittel-Wissenschaft und-Technologie, vol. 35, pp. 30-33 (2002).
Office Action issued Dec. 9, 2014 in JP Application No. 2010-241161.
Imai et al, "Classification of Various Wheat Flour with Granule Size Distribution," Noppin Shokuhin Kagaku Kogaku Kaishi, vol. 47, No. 1, pp. 17-22 (2000).
Agriculture, Forestry, and Fishery Statistics, Table of Supply and Demand for Foodstuffs, Barley Supply and Demand Forecast (<http://www.e-stat.go.jp/SG1/estat/List.do?lid=000001064939>) (admitted prior art).
FDA, "Food and Drug Administration 21 CFR Part 101" (http://www.fda.gov/ohrms/dockets/98FR/04p-0512-nfr0001) (published May 22, 2006).
Ikegami et al, "Effect of boiled barley-rice-feeding in hypercholesterolemic and normolipemic subjects," Plant Foods for Human Nutrition, vol. 49, pp. 317-328 (1996).
Oda et al, "Effects of Soluble and Insoluble Fiber Preparations Isolated from Oat, Barley, and Wheat on Liver Cholesterol Accumulation in Cholesterol-Fed Rats," J. Nutr. Sci. Vitaminol., vol. 39, pp. 73-79 (1993).
Sato et al, "Effects of Dietary Fiber on Carbohydrate Metabolism—A Study in Healthy Subjects and Diabetic Patients," Health, Physical Fitness, Sports, vol. 13, No. 1, pp. 75-78 (1990).
Egashira et al, "Dietary Intake of Dietary Fiber and Cancer," Journal of the Japan Dietary Fiber Society, vol. 9, No. 1, pp. 1-11 (2005).
Barley Pedia (<http://www.oh-mugi.com/>) (admitted prior art).
Ohno et al, "Effect of the Pulverization Method Affects on the Quality of Naked Barly Flour," Bulletin of Industrial Research Institutes of Ehime Prefecture, vol. 42, pp. 16-20 (2004).
Ohno et al, "Studies on Manufacturing Method of Naked Barly Flour (Part 1)—Manufacturing Property of Naked Barly Flour for Confectionery," Bulletin of Industrial Institutes of Ehime Prefecture, vol. 43, pp. 34-38 (2005).
Ohno et al, "Studies on Menufacturing Method of Naked Barly Flour (Part 2)—Manufacturing Property of Naked Barly Flour for Noodle and Bread," Bulletin of Industrial Research Institutes of Ehime Prefecture, vol. 43, pp. 39-44 (2005).
Technical Report of the Industrial Center of Ehime Prefecture, vol. 161, p. 14 (2003).
Proceedings of the Ehime Prefectural Science and Technology Conference, Mar. 18, 2003.
National Agriculture and Food Research Organization, National Institute of Crop Science, press release, "'View Fiber,' New variety of 'high ?-glucan-containing barley' containing two to three times the dietary fiber of conventional varieties" (Sep. 16, 2009).
9th International Barley Genetics Symposium Proceedings, pp. 595-600 (2004).
Kaye & Laby Tables of Physical & Chemical Constants, Subsection 2.5.4 "Colorimetry", National Physical Laboratory (1986).
Int'l Search Report and Written Opinion issued Dec. 20, 2011 in Int'l Application No. PCT/JP2011/074539.
Mitsunaga et al, "Polishing and Milling of Barley Grain for Wider Use in Foodstuffs," Mem. Fac. Agr. Kinki Univ., vol. 27, pp. 55-62 (1994).
Int'l Preliminary Report on Patentability issued Apr. 30, 2013 in Int'l Application No. PCT/JP2011/074539.
Office Action issued Jun. 7, 2016 in GB Application No. 13079967.7.

\* cited by examiner

Microscopic observation results
A: Barley coarse flour
B: Barley coarse flour (Comparative product)
C: Barley fine flour
D: Wheat flour

METHOD OF MANUFACTURING GRAIN FLOUR

CROSS-REFERENCE TO RELATED APPLICATION

This application is a Section 371 of International Application No. PCT/JP2011/074539, filed Oct. 25, 2011, which was published in the Japanese language on May 3, 2012, under International Publication No. WO 2012/057129 A1, and the disclosure of which is incorporated herein by reference.

TECHNICAL FIELD

The present invention relates to a grain flour and to foods employing this grain flour as an ingredient. The grain flour of the present invention is a milled product of barley or oats with a high β-glucan content which is a type of water-soluble dietary fiber.

TECHNICAL BACKGROUND

Barley is a grain that has been a familiar part of the Japanese diet since ancient times in the form of cooked barley and rice, and the like. With the spread of polished rice and the Westernization of food, the consumption of barley has decreased. In recent years, it has accounted for only a small part of grain consumption. The annual per capital consumption of barley in Japan is 0.3 kg, as compared to about 60 kg for polished rice and 33 kg for wheat (Non-Patent Reference 1). Additionally, grains such as barley and oats contain relatively large amounts of β-glucans, a water-soluble dietary fiber, physiological functions of which have drawn considerable attention. β-Glucans are polysaccharides with 1-3 and 1-4 glucose bonds ((1-3), (1-4)-β-D-glucans). They are also the primary component of the walls of barley endosperm cells, constituting about 70 percent. There have been many reports of the health functions of β-glucans. For example, the US Food and Drug Administration (FDA) has allowed health claims that barley β-glucans have the effects of lowering serum cholesterol levels and reducing the risk of coronary heart disease (for example, Non-Patent Reference 2).

In Japan, as well, there have been reports that the dietary consumption of barley and oats lowers blood cholesterol (for example, Non-Patent References 3 and 4) and inhibits a rise in blood sugar level following a meal (for example, Non-Patent Reference 5). There have also been reports of various researches on dietary fiber and cancer prevention (for example, Non-Patent Reference 6).

As stated forth above, barley and oats are grains known to contain relatively large amounts of β-glucans. The content thereof is normally said to be about 3 to 6 mass % (for example, Non-Patent Reference 7). Accordingly, numerous methods of extracting β-glucans have been investigated. Examples are the method of production by aqueous extraction employing barley as a starting material (for example, Patent Reference 1), the method of obtaining β-glucans by alkali extraction, neutralization, and alcohol precipitation employing barley and oats as starting materials (for example, Patent Reference 2), the method of extracting β-glucans in 80° C. to 90° C. hot water (for example, Patent Reference 3), and the like. While not an extraction method, the method of raising the content of β-glucans in grain by milling and sifting grain has also been proposed (for example, Patent Reference 4).

However, the methods are basically methods of separating and concentrating β-glucans from grains such as barley. As set forth above, the quantity of β-glucans in grains such as barley is about 3 to 6 mass %. Compared to other components such as starches and proteins, this content is quite low. Accordingly, the residue following extraction is quite large relative to the β-glucan finished product, and must be used in low value-added products such as animal feeds or discarded as waste. Thus, the cost per unit of the product necessarily rises, restricting its use to certain supplements and in common foods, and rendering its widespread use problematic.

Thus, most of the methods that have been proposed thus far consist of concentrating the components of natural materials with health functions by extraction and separation for use in supplements and common foods. The artificial use of some of the components of natural materials and their use in medical treatment is effective in cases such as when it is necessary to control the intake of other natural components. However, such uses are not necessarily suitable in cases of consumption as common foods. For example, the good compositional balance of natural components ends up being compromised, harmful substances end up being unintentionally concentrated and accumulated, and large quantities of unused waste end up being produced as by-products. As a result, there tends to be a drawback in the form of high production costs.

There have also been efforts to popularize barley foods in which barley is utilized as is as a foodstuff (for example, Non-Patent Reference 7). However, the consumption of cooked barley and rice is limited. There is thus a need to develop various applied foods. When employed in applied foods, it is necessary to utilize not just polished barley grains, but to produce flour and formulate it into various food materials.

The milling of grains for use in foods has been a common practice since ancient times. Dietary fibers, including grain flours containing β-glucans, are commercially available. However, most of the β-glucan-containing grain flours thus far have had coarse particles, and most have lacked whiteness and been grayish-brown. There have been limits to the ability to provide foods that are both tasty and appealing in appearance.

Various methods of reducing the size of the particles of barley flour have been examined for such purposes. For example, the effects of different methods of milling on properties have been examined with the goal of developing a hulless barley flour that is suitable to processing (for example, Non-Patent References 8, 9, 10).

The development of types of barley that contain high contents of dietary fiber, particularly β-glucans 7 to 10% or more, through the improvement of barley varieties has been advancing (for example, Non-Patent Reference 13). The possibility of taking in quantities of β-glucans that are suited to the health without separating and concentrating β-glucans is increased by using these barley varieties with high β-glucan contents.

PRIOR ART

Patent References

[Patent Reference 1] Japanese Examined Patent Publication (KOKOKU) Heisei No. 4-11197
[Patent Reference 2] Japanese Examined Patent Publication (KOKOKU) Heisei No. 6-83652

[Patent Reference 3] Japanese Unexamined Patent Publication (KOKAI) Heisei No. 11-225706
[Patent Reference 4] Japanese Unexamined Patent Publication (KOKAI) No. 2007-204699
[Patent Reference 5] Japanese Unexamined Patent Publication (KOKAI) Heisei No. 2006-247526

Non-Patent References

[Non-Patent Reference 1] Agriculture, Forestry, and Fishery Statistics, Table of Supply and Demand for Foodstuffs, Barley Supply and Demand Forecast (http://www.e-stat.go.jp/SG1/estat/List.do?lid=000001064939)
[Non-Patent Reference 2] FDA, "Food and Drug Administration 21 CFR Part 101" (http://www.fda.gov/ohrms/dockets/98FR/04p-0512-nfr0001.pdf)
[Non-Patent Reference 3] Plant Foods for Human Nutrition, 49, 317-328 (1996)
[Non-Patent Reference 4] J. Nutr. Sci. Vitanomol. 39, 73-79 (1993)
[Non-Patent Reference 5] Overall Health and Physical Education Science, Vol. 13, 75-78 (1990)
[Non-Patent Reference 6] Journal of the Japan Dietary fiber Society, Vol. 9, 1-11 (2005)
[Non-Patent Reference 7] Barley PEDIA (http://www.oh-mugi.com/)
[Non-Patent Reference 8] Bulletin of Industrial Research Institutes of Ehime Prefecture, Vol. 42, pp. 16-20 (2004)
[Non-Patent Reference 9] Bulletin of Industrial Research Institutes of Ehime Prefecture, Vol. 43, pp. 34-38 (2005)
[Non-Patent Reference 10] Bulletin of Industrial Research Institutes of Ehime Prefecture, Vol. 43, pp. 39-44 (2005)
[Non-Patent Reference 11] Industrial Center of Ehime Prefecture, Technical Report, Vol. 161, p. 14 (2003)
[Non-Patent Reference 12] Proceedings of the Ehime Prefectural Science and Technology Conference (Mar. 18, 2003)
[Non-Patent Reference 13] National Agriculture and Food Research Organization, National Institute of Crop Science, press release, "'View Fiber,' New variety of 'high β-glucan-containing barley' containing two to three times the dietary fiber of conventional varieties" (http://nics.naro.affrc.go.jp/press/press-48.html)
[Non-Patent Reference 14] $9^{th}$ International Barley Genetics Symposium Proceedings: 595-600 (2004)
[Non-Patent Reference 15] CIE Publication No. 15,2: Colorimetry second edition (1986)

Non-Patent References 8, 9, and 10, which relate to methods of reducing the particle size of barley flour, employ flours with different particle size distributions that are obtained with an impact crusher (Meino impact crusher) and fine grinders (blade mills, made by Nisshin Engineering, Inc.) to make sample runs and evaluate various foods. As a result, the four obtained with the impact crusher is stated to be suitable for use in cookies, and those obtained with the fine crushers are stated to be suitable for use in sponge cake, soy sauce crackers, udon noodles, Chinese noodles, and plain bread. The hulless barley flours that are disclosed in these references have an average particle diameter of 36 μm when obtained by impact crusher and a finer average particle diameter of 16 μm when obtained by fine grinders. There are no differences in components between the coarse flour and the fine flour, nor is there any mention of differences in color in terms of the external appearance or coloration when wheat or the like is blended in (Non-Patent Reference 11). Further, the size of the starch particles of the hulless barley is about 15 μm. In terms of food suitability, it may be desirable not to crush the starch particles. Thus, the issue of whether or not it is necessarily good to conduct fine milling is being disputed (Non-Patent Reference 12). As a result, there are unresolved issues relating to suitable particle size, proper food processing, manifestation of flavor, differences in color and external appearance, and the like.

Generally, when a barley variety of high β-glucan content is employed, the water-soluble dietary fibers such as β-glucans will be present as components of the walls of the endosperm cells of barley seeds. Barley with a high β-glucan content presents the problems of hardening of the endosperm and the additional time required for shelling during the barley polishing step (for example, Non-Patent Reference 14). There is also a problem in that the endosperm cell wall is hard and fine milling is difficult. Accordingly, the fine milling of high β-glucan-content barley has been difficult using the milling techniques developed thus far, and it has been difficult to uniformly mix the coarse flour of barley that has been obtained up to this point, even with common wheat flour (average particle diameter 50 to 100 μm). For example, even when uniformly dispersed, when made into a food, flours with a large amount of vegetable fiber and with large-diameter grains present problems in that they normally appear brown, tend to fool the eye when foreign matter is mixed in, produce a rough sensation in the mouth, and reduce the value of products.

Accordingly, the object of the present invention is to provide a grain flour employing an ingredient in the form of barley or oats with a high β-glucan content (also referred to as "barley and the like", or simply as "grain," hereinafter), retaining to the extent possible the natural composition of edible portions of barley and the like, maintaining the healthy functional components contained in barley and the like without degradation during the milling process, having a highly white color that is similar to that of wheat flour, and having a particle diameter that readily and uniformly mixes with wheat flour. Here, in general, shelled grain the outer shell of which has been removed can be used as an edible portion of barley and the like. It is also possible to employ the entire particle while retaining part or all of the outer shell. A further object of the present invention is to provide a method permitting the production of this grain flour by a method that is relatively low cost, and thus relatively simple. A still further object of the present invention is to provide a food of good external appearance and taste employing the grain flour of the present invention.

The present inventors discovered that it was possible to obtain a fine flour with a particle diameter and a particle size distribution that were suitable for solving the above-stated problems by finely milling a coarse flour of grain granules such as barley granules with an airstream-type crusher that conducts fine crushing with multiple vortex airstreams. The present invention was devised on that basis.

That is, the present inventors discovered that it was possible to obtain a food that mixed readily with other food materials and exhibited an appealing appearance and good flavor without a sense of foreign matter when applied as a food by forming fine particles of flour of suitable particle diameter distribution by conducting fine crushing with multiple vortex airstreams with an airstream-type crusher in a state in which every effort was made to maintain the natural component composition of the starting material grain while employing a starting material in the form of a grain containing an abundance of health function components such as dietary fiber. The present invention was devised on that basis.

SUMMARY OF THE INVENTION

The present invention is as set forth below.

[1] A grain flour in the form of a flour comprised of the milled product of grain granules of at least one grain selected from the group consisting of barley and oats, characterized:

by an average particle diameter falling within a range of 40 to 100 μm;

in that the content of particles with a particle diameter of less than 20 μm is 20 mass % or less;

in that the content of particles with a particle diameter falling within a range of 20 to 100 μm falls within a range of 20 to 60 mass %;

in that the content of particles with a particle diameter falling within a range of greater than 100 μm to 500 μm falls within a range of 20 to 60 mass %; and in that the content of particles with a particle diameter falling within a range of greater than 500 μm is 20 mass % or less.

[2] The grain flour according to [1] wherein the β-glucan content of the grain flour falls within a range of 60 to 100% of the content of β-glucan in the grain granules prior to milling.

[3] The grain flour according to [1] or [2] wherein milling is implemented by a step of milling grain granules into a coarse flour and a step of finely milling the coarse flour obtained such that in the fine milling, milling is conducted by airstream fine crushing at a product temperature of 50° C. or lower.

[4] The grain flour according to any one of [1] to [3] wherein the β-glucan content falls within a range of 4 to 12%.

[5] The grain flour according to any one of [1] to [4] wherein the color difference from white dE (by the CIE Lab color representation method specified by the CIE; CIE; International Commission on Illumination) is 15 or less.

[6] A method for manufacturing grain flour according to any one of [1] to [5], comprising a step of milling grain granules into a coarse flour and a step of finely milling the coarse flour obtained, wherein the fine milling is conducted by airstream fine crushing at a product temperature of 50° C. or lower.

[7] The manufacturing method according to [6], wherein the airstream fine crushing is fine milling with multiple vortex airstreams.

[8] A food manufactured from a starting material into which at least 5% or more of the grain flour according to any one of [1] to [5] is compounded.

[9] A noodle that is white and does not produce a sensation of foreign matter on the surface thereof, that is manufactured from starting materials including the grain flour according to any one of [1] to [5] and wheat flour.

[10] A bread that is the color of wheat and does not produce a sensation of foreign matter on the surface thereof, that is manufactured from starting materials including the grain flour according to any one of [1] to [5] and wheat flour.

Effect of the Invention

The present invention provides a food that is tasty and that does not have an external appearance that provides a sensation of foreign matter by obtaining a grain flour of good dispersion stability. The grain flour is obtained by uniformly mixing with the usual food materials while retaining the components of natural materials to the extent possible without concentrating the health function components of natural materials by extraction or separation, without destroying the good compositional balance of natural components, without unintentionally concentrating and accumulating harmful substances, and without producing large quantities of unused waste material as by-products.

The present invention employs an ingredient such as barley containing an abundance of health function components such as dietary fiber and renders it as fine particles while maintaining the natural component composition of the edible portion of the starting material grain to the extent possible. Thus, the flour that is obtained can be readily mixed with other food materials such as wheat flour. When employed as a food ingredient, it yields a tasty food with an external appearance that does not produce a sensation of foreign matter. The grain flour of the present invention contains dietary fibers in the form of the health function components present in grains, particularly a large amount of β-glucans. By using the grain flour as an ingredient, it is possible to provide a tasty food with an appealing external appearance. Since the grain flour of the present invention retains nearly the entire edible composition of natural grains, it affords good flavor and nutrition. The grain flour of the present invention can naturally be employed as a supplement and the like in the form of health foods. It can also be broadly employed as an ingredient in common foods such as bread, noodles, Japanese and foreign snacks, and drinks.

MODES OF CARRYING OUT THE INVENTION

[Grain Flour]

Figure 1:
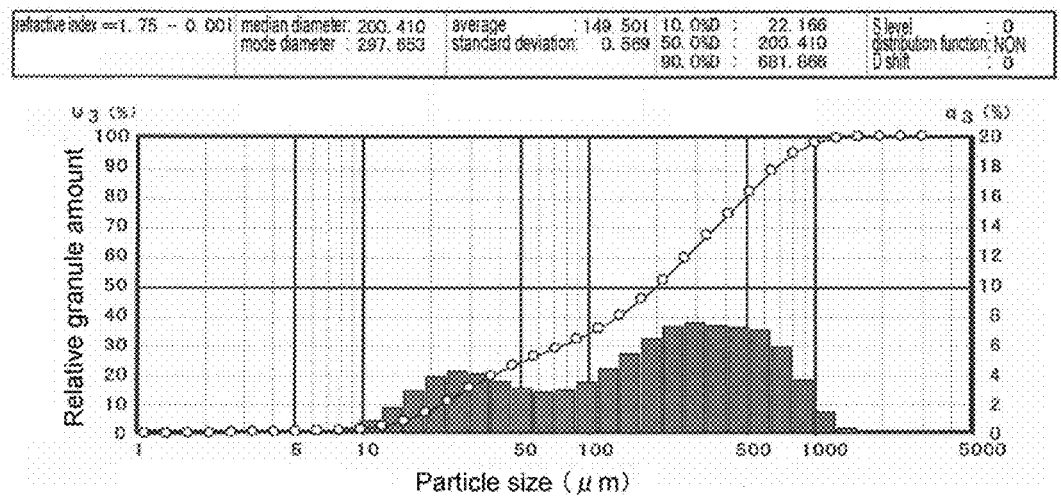
FIG. 1 shows the particle size distribution of coarse flour A.

The grain flour of the present invention, comprised of the milled product of grain granules of at least one grain selected from the group consisting of barley and oats, is characterized:

by an average particle diameter falling within a range of 40 to 100 μm;

in that the content of particles with a particle diameter of less than 20 μm is 20 mass % or less;

in that the content of particles with a particle diameter falling within a range of 20 to 100 μm falls within a range of 20 to 60 mass %;

in that the content of particles with a particle diameter falling within a range of greater than 100 μm to 500 μm falls within a range of 20 to 60 mass %; and in that the content of particles with a particle diameter falling within a range of greater than 500 μm falls within a range of 20 mass % or less.

The grain flour of the present invention is a flour comprised of the milled product of grain granules of at least one grain selected from the group consisting of barley and oats. Thus, essentially the entire quantity of components of the starting material flour is contained in the flour. As a result, it is possible to utilize the nutritional components originally present in barley and the like as is, and not produce waste material by-products.

Barley and oats containing health function vegetable fibers, particularly β-glucans, are employed as the grains serving as starting materials of the grain flour of the present invention. In barley and oats, the higher the dietary fiber and β-glucan content, the higher the dietary fiber and β-glucan content of the grain flour obtained, and the greater the product value. The molecular weight of β-glucans is sometimes partially reduced by the effects of enzymes present in the grain itself β-glucanase) in the polishing step and milling step. However, in the present invention, no artificial molecular weight reducing enzyme is added and no molecular weight reducing step is intentionally incorporated. The reason is that the β-glucans contained in natural barley and oats have molecular weights of $10^5$ or higher and have been contained in food since ancient times. By contrast, products the molecular weight of which has been artificially lowered are the result of new research and development. The goal behind them differs from the goal of consuming natural materials as foods.

Various varieties of barley and oats can be employed as the grain. The variety is not specifically limited. Generally, grain granules are shelled to remove the outer shell for use. Depending on the extent of shelling, part or all of the outer shell can be left on. Unshelled use as hulless barley is also possible. Various polished barley products can be employed, such as rolled grain after pearling (oshimugi), cut to half and rolled grain after pearling (hakubaku), and cut to half and pearled grain (beiryubaku) can be employed. These grain granules can be applied to the manufacturing method of the present invention.

The average particle diameter of the grain flour of the present invention falls within a range of 40 to 100 μm. With an average particle diameter within this range, the average particle diameter approaches that of wheat flour and mixing with wheat flour is facilitated. The average particle diameter preferably falls within a range of 50 to 90 μm.

In the grain flour of the present invention, the content of particles with a particle diameter of less than 20 μm is 20 mass % or less. Particles with a particle diameter of less than 20 μm include particles that are formed when the particles of the starch constituting the grain granules are damaged during the milling process. The greater the quantity thereof, the greater the degree of damage to the starch. When the degree of damage to the starch is high, there is a problem in that expansion property deteriorates when employed in bread. The content of particles with a particle diameter of 20 μm or lower is preferably 18 mass % or lower.

In the grain flour of the present invention, the content of particles with a particle diameter falling within a range of 20 to 100 μm falls within a range of 20 to 60 mass %. A particle diameter of 20 to 100 μm is close to the particle diameter of wheat flour. The larger the quantity of such particles, the easier mixing with wheat flour becomes. Thus, a content of 20 weight percent or more is suitable. However, the β-glucan content of barley and the like is high. Thus, milling is difficult. When intense milling is conducted, there is a risk of components undergoing too much degradation. Thus, the upper limit is set at 60 mass %. The content of particles with a particle diameter of 20 to 100 μm preferably falls within a range of 25 to 60 mass %, more preferably within a range of 30 to 60 mass %.

In the grain flour of the present invention, the content of particles with a particle diameter falling within a range of greater than 100 μm to 500 μm falls within a range of 20 to 60 mass %. Keeping the content of particles with particle diameters falling within a range of greater than 100 μm to 500 μm to within the above range is somewhat of a departure from the particle size distribution of wheat flour. However, by keeping the quantity of particles within this range relatively small, discoloration of the flour is inhibited, mixing with wheat flour is facilitated, and the gritty imparted to foods is eliminated. The content of particles having a particle diameter falling within a range of greater than 100 μm to 500 μm preferably falls within a range of 30 to 55 mass %.

The content of particles with a particle diameter exceeding 500 μm is 5% or less in the grain flour of the present invention. Keeping the content of particles with a particle diameter exceeding 500 μm to 5% or less achieves a particle size distribution that is nearly identical to that of wheat flour. Inhibiting the content of particles falling within this range eliminates gritty when used in foods. The content of particles with particle diameters exceeding 500 μm is preferably 3% or less, still more preferably 1% or less.

In the grain flour of the present invention, the content of β-glucans [(1-3), (1-4)-β-D-glucans] desirably falls within a range of 60% to 100% of the content of β-glucans in the grain granules prior to milling. The grain flour of the present invention preferably has a high β-glucan content. This is desirably comprised of β-glucans that are not degraded and lost during the milling process. The above range is preferably 80 to 100%.

The milling for manufacturing the grain flour of the present invention is desirably implemented by a step of milling grain granules into a coarse flour and a step of finely milling the coarse flour obtained such that in the fine milling, milling is conducted by airstream fine crushing at a product temperature of 50° C. or lower. In this manner, the grain flour of the present invention preferably has a high content of β-glucans, and is one in which β-glucans do not degrade and become lost in the milling step. The method and conditions of milling are described in detail further below.

The grain flour of the present invention can be one in which the content of β-glucans falls within a range of 4 to 12%. The use of grain granules with a high β-glucan content as an ingredient yields a grain flour with a proportionately high β-glucan content. In the grain flour of the present invention, the content of β-glucans desirably falls within a range of 6 to 12%. This does not exclude barley with a β-glucan content exceeding 12%.

In the grain flour of the present invention, color difference from white dE (by the CIE Lab color representation method specified by the CIE; CIE: International Commission on Illumination) is 15 or less. When the color difference from white dE is 15 or less, the color is nearly identical to the color of white food starting material flours such as wheat flour, and it becomes possible to prevent the food in which the grain flour of the present invention is employed as an ingredient from discoloring and decreasing in product value. The color difference dE from white is preferably 11 or less. The color difference dE from white of the wheat flour is 8 or less, preferably 5 or less. The coarse barley flour employed as an ingredient in the grain flour of the present invention has a color difference dE from white that is about 19.

Here, the color difference is defined as set forth below (for example, see Non-Patent Reference 15) in the CIE (International Illumination Commission) Lab (L (luminosity), a (red-green), b (yellow-blue) color representation system.

Color Difference Value Evaluation
The color difference value (dE) is as given below in NBS (US National Bureau of Standards):

| $dE = \sqrt{((dL)^2 + (da)^2 + (db)^2)}$ | |
|---|---|
| dE* color difference sensation | |
| 0 to 0.5 | Trace | faintly noticeable |
| 0.5 to 1.5 | Slight | slightly noticeable |
| 1.5 to 3.0 | Noticeable | clearly noticeable |
| 3.0 to 6.0 | Appreciable | prominently noticeable |
| 6.0 to 12 | Much | great |
| 12 and above | Very Much | extremely great |

In the above definitions, a color difference of 1.5 to 3.0 is expressed as being "clearly noticeable" and 3.0 to 6.0 is "prominently noticeable." However, compared to the pale yellow color of wheat, fine barley flour does not look yellow and seems intensely white. In the case of a mixed flour, the color difference is nearly imperceptible. By contrast, in the coarse flour prior to fine milling, the color difference is 10 and a color difference in external appearance is clearly noticeable. When it is combined with wheat, water is added, and kneading is conducted to prepare dough, the coarse flour prior to fine milling that is prepared as dough exhibits brown spots and tends to create a false impression of contamination by foreign matter. However, the flour of the present invention exhibits no impression of foreign matter.

The grain flour of the present invention is characterized by a high degree of whiteness and can be roasted for use. When roasted, the grain flour of the present invention can be mixed for use with coffee, cocoa, chocolate, curry powder, ketchup, and the like. Since whiteness is high even when used in such manners, compared to powders that are brown or gray, it is characterized by the manifestation of beautiful colors when used as a targeted blended product or in foods and exhibits a high product value. In such applications, a mixture obtained by mixing with a preroasted ingredient or colored ingredient can be finely ground for use.

The grain flour of the present invention is much whiter than coarse flour. Since it is extremely white, when blended with wheat, the color difference decreases to an almost imperceptible level. The reason for this is unclear. It is possible that fine milling causes aggregates of colored substances to break apart, the light scattering coefficient increases, and observation with the naked eye becomes difficult. It is also possible that a portion of the discolored substances that are finely ground are removed in the milling step. The milling mechanism of the fine crusher employed in the present invention could also be affected. Regardless, the present invention provides a grain flour comprised of fine powder that is desirable for food applications and the development of foods, independently of elucidation of the production mechanism or fading mechanism of the contents of the color-developing components.

[The Method for Manufacturing Grain Flour]

The method for manufacturing grain flour of the present invention comprises a step of milling grain granules into a coarse flour and a step of finely milling the coarse flour obtained, wherein the fine milling is conducted by airstream fine crushing at a product temperature of 50° C. or lower. The above-described grain flour of the present invention can be produced by this manufacturing method. The above airstream fine crushing is preferably fine milling by multiple vortex airstreams from the perspective of milling at a product temperature of 50° C. or lower.

The example of the case of manufacturing barley flour from barley will be described.

The barley can be of the usual varieties. However, various varieties with high vegetable fiber contents, particularly β-glucan contents, have been developed, and their use as starting materials is preferred. The outer shell of the barley particles is removed by the usual barley polishing step to polish them into barley particles. The usual flour milling step is then used to grind the barley into flour. The barley flour that is obtained here is usually about 150 μm in average particle diameter, which is larger than the about 50 μm average particle diameter of wheat flour. A common flour milling step can be applied in the flour milling step to produce coarse flour so long as the method of milling flour does not greatly compromise product quality; there is no specific limitation.

The coarse barley flour is then finely ground to obtain a fine flour with an average particle diameter of 100 μm or less. Generally, milling methods include mechanical milling in the form of rotational impact types such as roll mills, hammer mills, and pin mills; and tumbler types such as ball mills and vibration mills. In airstream type milling devices, a highly pressurized high volume of compressed air is blown into a milling chamber and a high-speed airstream in the neighborhood of the speed of sound is used to cause the ingredients to collide together, or the ingredients to collide with the inner walls of the device and undergo milling. They afford the advantage of permitting fine milling that is nearly unaffected by heat generated by milling and the like. In these milling methods, the state of milling varies with the structure of the mill and the operating conditions. Great differences usually result from the physical properties and characteristics of the milled product. In the milling of grain, it is extremely important to inhibit the deterioration and degeneration of components. That is difficult to accomplish with a mechanical mill alone. Fine milling with an airstream type crushing yields the grain flour of the present invention.

The airstream-type crushing employed in the Examples is a fine crusher STAY made by Varie Japan Inc. It is a crusher in which a number of vortex airstreams generated by special mechanisms cause shearing of the ingredient, finely milling it in micron units (see Patent Reference 5). A combination of swirling flows and reverse airstreams produced by rotors and blades causes the number of vortex airstreams to play the role of cutters, shearing is created based on the flow direction of the airstreams. In this milling method in the low-speed range, the heat generated during milling is suppressed and thermal degradation of the product can be prevented. Even barley of high β-glucan content can be properly and finely milled by such an airstream-type crusher to prepare the grain flour of the present invention.

In operation of the polishing and milling step from a barley starting material, with the exception of the initial shelling step of removing the outer shell, there is no specific step of concentrating and separating grain components. In the milling step, fine milling is essentially achieved physically. In the fine milling step, an airstream-type crushing method is adopted to maintain a flour product temperature of 50° C. or lower. In methods of milling fine powders by mechanical contact, it is difficult to maintain a product temperature of 50° C. or lower. A product temperature of 50° C. or higher is undesirable in that coloration of the grain flour is observed.

[Foods]

The present invention includes foods that are produced from ingredients comprising at least 5% or more of the above grain flour of the present invention. The present invention further includes noodles produced from ingredients containing the above grain flour of the present invention and wheat flour. Such noodles are white and do not have surfaces that create an impression of foreign matter. The present invention further includes breads produced from ingredients containing the above grain flour of the present invention and wheat flour. Such breads have a wheat color and do not have surfaces that create an impression of foreign matter.

It is possible to prepare various tasty foods with good external appearances using the grain flour of the present invention. For example, when preparing noodles in which 15% barley fine flour is compounded into wheat flour, tasty noodles that are nearly 100% identical to 100% wheat noodles in external appearance, are smooth in texture, go down smoothly, and have good consistency are obtained. Even when 30% fine barley flour is compounded, competitive noodles are obtained. When 50% is compounded, an extremely pale peach color that appears somewhat transparent is exhibited, but there is much less coloration than in noodles employing conventional barley flour, the coloration is nearly uniform, and there is no impression of foreign matter. There is thus commercial value as a new noodle that can be pursued.

Examples of foods in which the grain flour of the present invention can be employed as an ingredient are wheat products such as bread; products made in rice cookers and rice confections; processed rice products such as rice vermicelli; processed corn products such as corn snacks; soy products such as tofu; processed oil and fat products; processed meat products; kneaded products such as fish paste and steamed minced fish; processed aquatic products; dairy products such as cheese; lactic acid fermented products such as yogurt; Japanese and Western confections such as candies, steamed breads, bean-jam pancakes, cakes and chocolate; puffed foods such as pon confections; desserts such as jellies and custard puddings; frozen confections such as ice cream; drinks such as soy milk, milk, fruit juices, and tea; jelly foods such as drinkable jellies; premixed products such as jelly and custard powders and their finished products; personal preference foods such as curries, soups, and coffees; cooked foods such as hamburgers, steamed meat dumplings, dumplings, and meatballs; cup noodles; retort foods; instant foods; health foods; low-calorie foods; foods for people with allergies; baby foods; foods for the elderly; beauty foods; medicinal foods; frozen foods; canned goods; processed oil and fat products such as margarines, shortenings, dressings, whipped cream, and sauces; and seasonings. However, there is no limitation thereto.

Foods employing the grain flour of the present invention are characterized by a high degree of whiteness without coloration. They can be mixed with roasted grain flours, coffee, cocoa, chocolate, curry powder, ketchup, and the like and used in colored foods. In such uses, since the fine flour of the present invention is of a suitable particle diameter and size and has a high degree of whiteness, the targeted blended product and foods employing it are characterized by exhibiting more appealing colors than the original brown and gray. That imparts greater commercial value.

The grain flour of the present invention is preferably compounded in a proportion of 5% or more, more preferably compounded in a proportion of 10% or more, and still more preferably compounded in a proportion of 15% or more. There is no specific upper limit, and 100% can be employed. Compounding 5% or more makes it possible to clearly recognize the tastiness of the food and anticipate a nutritional function. At less than 5%, the effects of the tastiness and nutritional characteristics of the grain flour of the present invention are sometimes not adequately realized.

Examples of food materials into which the grain flour of the present invention can be mixed for use are grain materials such as rice, wheat, and corn; protein materials such as sesame seeds, red beans, and soybeans; dairy products such as milk; fermented lactic acid products such as yogurts; processed oil and fat products such as margarines and shortenings; seasonings such as miso, soy sauce, and ketchup; sweeteners such as sugars; spices such as curry powder and Tabasco; processed aquatic foods and processed meat products; coffee; black tea; and green tea. It can also be compounded into natural materials and additives other than β-glucans that can be expected to have physiological functions. Examples of such additives are mushroom components, yeast fermentation components, seaweed components, calcium agents, and vitamin-fortifying food additives. The grain flour of the present invention can be widely used in pharmaceutical and cosmetic products in addition to foods.

EXAMPLES

The present invention is described in greater detail below through examples. However, the present invention is not limited by the examples.

[General Composition Analysis Methods]

Reliance was made on the Japan Food Analysis Center in this regard.

[Methods of Measuring Dietary Fibers]

Alkali solutions were added to barley and wheat flour samples and the mixtures were subjected to heat treatments to solubilize cell wall polysaccharides. Subsequently, acetic acid was added to neutralize the mixture, an enzymatic treatment was conducted with α-amylase, and the starch contained in the solution was digested. The supernatant from which the precipitate had been removed by centrifugation was recovered as cell wall polysaccharides (the hemicellulose fraction). The hemicellulose fraction thus obtained was hydrolyzed with dilute sulfuric acid and the structural sugars were analyzed by high-performance liquid chromatography (Dionex HPAEC-PAD). The total quantity of sugar in the hemicellulose fraction was quantified in accordance with the phenol sulfuric acid method (Dubois et al., 1956, Colorimetric method for determination of sugars and related substances. Anal. Chem., 28, 350-356). Enzymatic processing was conducted with lichenase following enzymatic treatment with α-amylase. By similarly analyzing the structural sugars, the (1-3), (1-4)-β-D-glucan content was obtained from the difference in the glucose content of structural sugars. The arabinoxylan content of barley and wheat flour samples was determined from the sum of the xylose content and L-arabinose content of the results of analysis of structural sugars obtained by processing identical to the above.

Example 1

Preparing Fine Flour C of the Present Invention by Fine Milling of Coarse Barley Flour A Polished *H. vulgare* f. distichon barley was coarsely milled and then milled in a high-speed mill (the screen size employed was 0.2 mm and sifting was conducted with a 60 mesh sifter screen). The coarse barley flour thus obtained (referred to as "coarse flour A" hereinafter; the average particle diameter of the flour was 150 μm, with flour with a particle diameter of 110 μm or less constituting 36%, flour with a particle diameter of 57 μm or less constituting 26%, and flour with a particle diameter of 516 μm constituting 19%) was finely milled with an airstream-type crusher (STAY-S, made by Vane Japan, Inc., blower 10 m³/min., processing time 10 kg/hr) to obtain fine flour C. The product temperature during the milling step was 35° C. (room temperature 29° C., humidity 74%, exhaust temperature 39° C.). The results of analysis of the general composition of fine flour C did not differ greatly from those of the polished starting material barley and coarse flour A. The edible (polished barley) component was essentially retained (Table 1).

TABLE 1

| Item | | Coarse flour A (Example 1) | Fine flour C (Example 1) | Coarse flour B (commercial product) |
|---|---|---|---|---|
| Moisture | | 10.0 | 9.6 | 11.1' |
| Protein | | 10.5 | 10.6 | 14.5 |
| Lipids | | 1.5 | 1.6 | 3.2 |
| Carbohydrates | Sugars | 66.5 | 66.5 | 48.4 |
| | Fiber | 10.9 | 11.0 | 20.9 |
| Ash | | 0.6 | 0.7 | 1.9 |
| Soluble dietary fiber | | 9.2 | 9.3 | |
| Insoluble dietary fiber | | 1.7 | 1.7 | |
| (1-3), (1-4)-β-D-glucans | | 4.8 | 4.6 | 7.61 |

Figure 2:
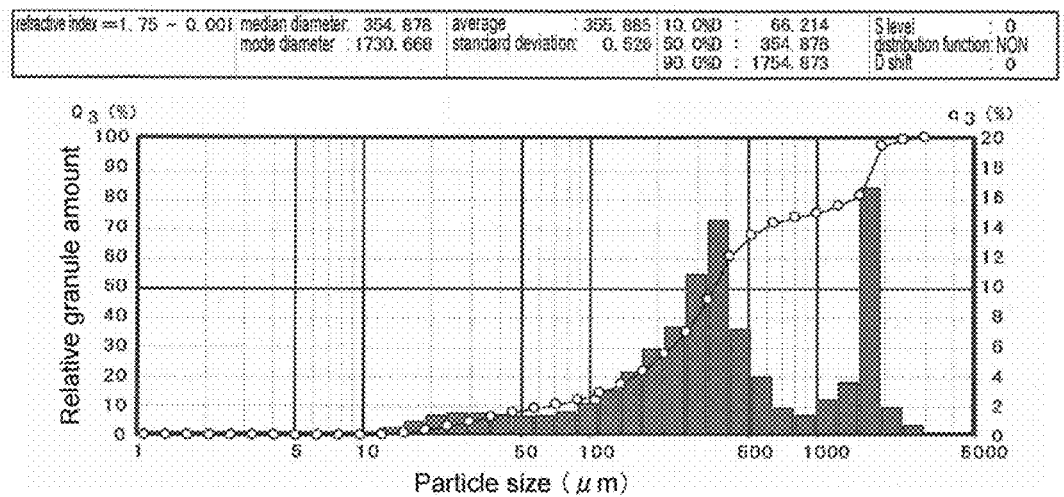
FIG. 2 shows the particle size distribution of coarse flour B.
Figure 3:
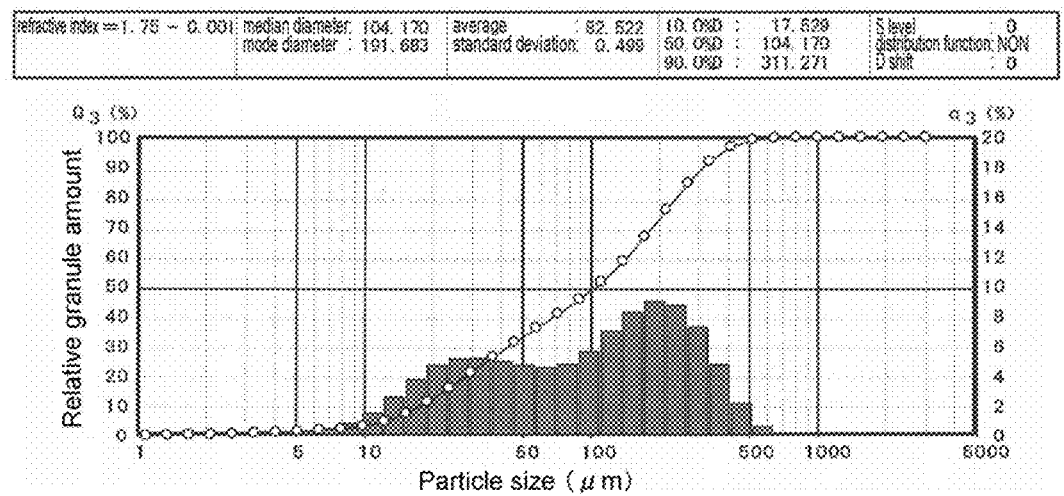
FIG. 3 shows the particle size distribution of fine flour C (the present invention).
Figure 4:
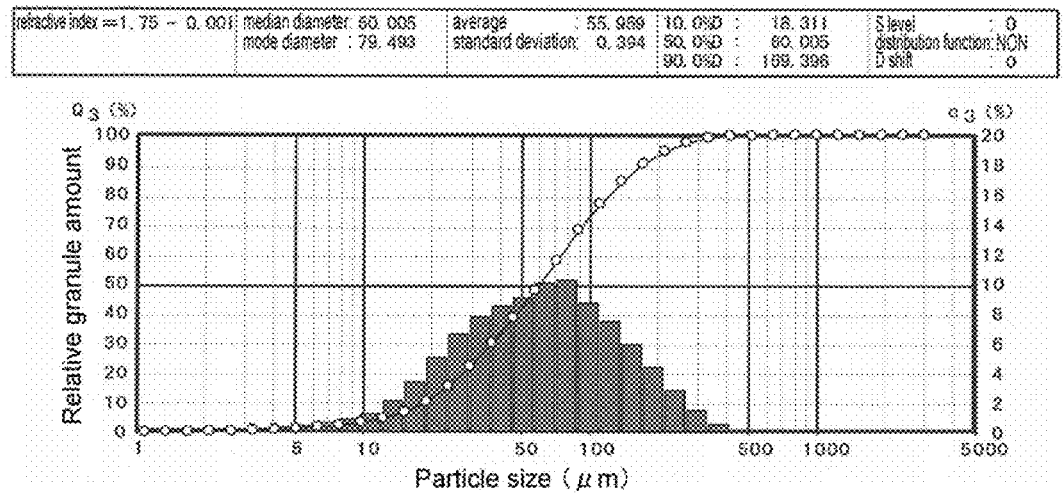
FIG. 4 shows the particle size distribution of wheat flour (all-purpose flour).
Figure 5:
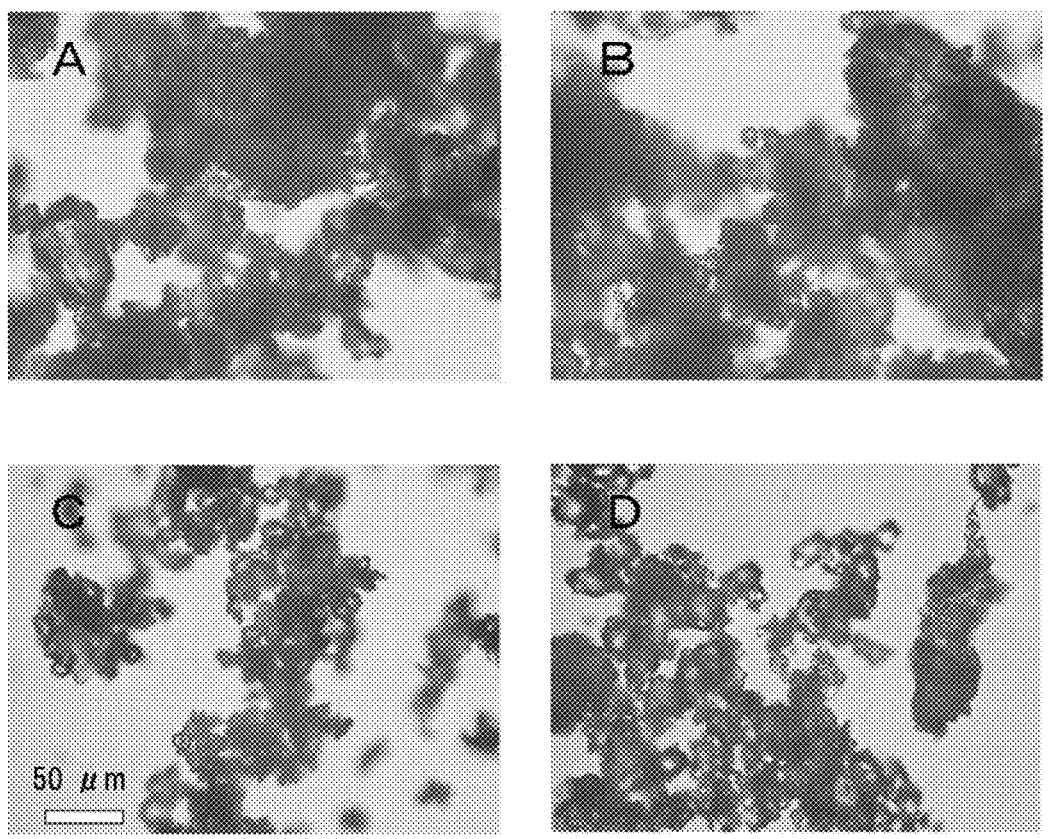
FIG. 5 shows photographs taken by microscope of coarse flours A and B, fine flour C (the present invention), and wheat flour (all-purpose flour).

Table 2 gives the average particle diameters of coarse flours A and B (commercial products), fine flour C (present invention), and wheat flour (all-purpose flour). The particle size distributions are given in FIGS. 1 to 4. The colors and color differences are given in Table 3. Fine flour C (present invention) was finely milled from coarse flour to a particle diameter closer to that of wheat flour than coarse flours A and B. Color difference measurement also revealed it to be closer to wheat than the coarse flours and that its degree of whiteness was also high. It was observed in microscopic photograph (FIG. 5) that relative to coarse flours A and B, fine flour C had a particle diameter and state of aggregation that were closer to those of wheat flour D (FIG. 2). The color difference was measured with a ZE2000 Color Measurement Color Meter (Nippon Denshoku Co., Ltd.). In the Examples below, fine flour C (present invention) was employed. Coarse flour A was also employed for comparison.

TABLE 2

| | Average particle diameter (μm) |
|---|---|
| Coarse barley flour A | 150 |
| Coarse barley flour B (commercial product) | 356 |
| Fine barley flour C (present invention) | 83 |
| Wheat flour D (commercial product) | 56 |

TABLE 3

| | Color | | | |
|---|---|---|---|---|
| | L (luminosity) | a (red-green) | b (yellow-blue) | External appearance |
| Coarse barley flour A | 84.28 | 1.70 | 10.33 | Predominantly brown |
| Coarse barley flour B (commercial product) | 84.42 | 1.60 | 9.22 | Predominantly brown |
| Fine barley flour C (present invention) | 94.51 | 0.39 | 4.80 | Greater luminosity than coarse flour, little red, little yellow, close to white. Close to wheat flour, but somewhat whiter. |
| Wheat flour D (commercial product) | 94.68 | −0.17 | 8.69 | Close to B, but somewhat more yellow. |
| White | 100 | 0 | 0 | |

| Difference in color from white | |
|---|---|
| | Color difference dE |
| Coarse barley flour A | 18.89 |
| Coarse barley flour B (commercial product) | 18.17 |
| Fine barley flour C (present invention) | 7.30 |
| Wheat flour D (commercial product) | 10.19 |

Example 2

Three types of flour were employed: 100% wheat flour; a mixture of 50% wheat flour and 50% fine barley flour C; and a mixture of 50% wheat flour and 50% coarse barley flour A. Water was added in a proportion of 50% of the flour and the mixture was kneaded to prepare dough. The dough was measured with a ZE2000 Color Measurement Color Meter (Nippon Denshoku Co., Ltd.).

Brown spots were present and an impression of foreign matter was presented by the dough prepared from coarse barley flour A. The dough prepared from fine barley flour C was uniform and presented no impression of foreign matter. The color and difference from white of the dough were measured on day 1 and day 2 following preparation of the dough. The dough prepared from fine barley flour C was close to wheat in color. The dough prepared from coarse barley flour A was more strongly brown. In particular, the brown color intensified with the passage of time. The results are given in Table 4.

TABLE 4

| | | Color of dough | | |
|---|---|---|---|---|
| | | L (luminosity) | a (red-green) | b (yellow-blue) |
| Day 1 | Dough of 100% wheat flour | 77.60 | −0.09 | 16.44 |
| | Dough containing 50% fine barley flour C | 69.80 | 2.76 | 14.57 |
| | Dough containing 50% of coarse barley flour A | 63.22 | 4.47 | 16.04 |
| Day 2 | Dough of 100% wheat flour | 72.81 | −0.20 | 15.77 |
| | Dough containing 50% fine barley flour C | 70.23 | 2.80 | 12.80 |
| | Dough containing 50% of coarse barley flour A | 57.94 | 6.96 | 11.45 |

TABLE 4-continued

| | Color difference from white | |
|---|---|---|
| | Day 1 | Day 2 |
| Dough of 100% wheat flour | 27.79 | 31.43 |
| Dough containing 50% fine barley flour C | 33.64 | 32.53 |
| Dough containing 50% of coarse barley flour A | 40.37 | 44.14 |

Example 3

Noodles were prepared using barley flour. Six types of grain flour (the blending proportions are given in Table 5) were employed: 100% wheat flour (all-purpose flour); wheat flour with 15% replacement with fine barley flour C; wheat flour with 30% replacement with fine barley flour C; wheat flour with 50% replacement with fine barley flour C; 100% fine barley flour C; and wheat flour with 15% replacement with coarse barley flour A. With the exception of the 100% fine barley flour, 0.8% brine was added to each of these, the mixture was thoroughly kneaded, and noodles were produced by the usual aging method. For the 100% fine barley flour, a paste was prepared with warm water from a portion of the flour, that portion was used to collect the remainder of the flour, and noodles were prepared by the paste method. These noodles were boiled in water, cooled with cold water, and employed in organoleptic evaluation.

TABLE 5

Material blending ratio of udon (Japanese noodle) using barley flour

| Test No. | Blend | Amount of water added |
|---|---|---|
| a | 100% wheat flour | 52% |
| b | 85% wheat flour, 15% fine barley flour C | 55% |
| c | 70% wheat flour, 30% fine barley flour C | 60% |
| d | 50% wheat flour, 50% fine barley flour C | 64% |
| e | 100% fine barley flour C | not measurable |
| f | 85% wheat flour, 15% coarse barley flour A | 55% |

The organoleptic evaluation panel was comprised of six trained professional panelists. The boiled noodle samples were employed at room temperature. The panelists conducted absolute evaluation on a five-step scale of <Quite good 5; Good 4; Ordinary 3; Poor 2; Quite poor 1> of the test samples for external appearance (color, impression of foreign matter), aroma, flavor, texture (amount of consistency, sensation going down), and overall evaluation (deliciousness). They were free to note any characteristics or the like that they noticed on their own.

TABLE 6

Organoleptic examination Evaluation criteria

| Evaluation | Taste | | | | |
|---|---|---|---|---|---|
| | Good | | Ordinary | | Bad |
| | Good | | Ordinary | | Poor |
| Evaluated item | 5 | 4 | 3 | 2 | 1 |
| | ◎ | ◎-○ | ○ | △ | X |

TABLE 6-continued

Organoleptic examination results (Evaluated items)

| | | Type of barley flour | | | | | |
|---|---|---|---|---|---|---|---|
| | | Fine flour C | | | | | Coarse flour A |
| | | Test no. | | | | | |
| | | a | b | c | d | e | f |
| Proportion of barley flour blended in | | 0% | 15% | 30% | 50% | 100% | 15% |
| External appearance | Color | 4.7 | 5 | 4.5 | 4 | 3.7 | 4.3 |
| | Impression of foreign matter | 5 | 5 | 5 | 5 | 5 | 2 |
| Aroma | | 5 | 5 | 5 | 5 | 4 | 5 |
| Taste | | 4.7 | 5 | 5 | 5 | 3.7 | 5 |
| Degree of consistency | | 4 | 5 | 4.5 | 4.3 | 4 | 4.7 |
| Sensation going down | | 4 | 5 | 5 | 4.5 | 4 | 4.7 |
| Overall evaluation (deliciousness) | | 4 | 5 | 4.7 | 4.5 | 4 | 4.5 |

Udon b (85% wheat flour, 15% fine barley flour C) was perceived as being whiter than udon a (100% wheat flour). The external appearance of udon b following boiling was much smoother and was evaluated to be more transparent than that of udon a (100% wheat flour). Upon consumption, udon b felt smooth, with a better sensation on the tongue than udon a (wheat flour alone). The taste of udon b was evaluated as good and the flavor as quite good. It was evaluated as being the most delicious among udons a through f.

Udon c (70% wheat flour, 30% fine barley flour C) was somewhat dull in color. It exhibited a poorer degree of consistency than udon b (15% fine barley flour), but exhibited better consistency than udon a (100% wheat flour).

Udon d (50% wheat flour, 50% fine barley flour C) presented a color upon boiling that was somewhat brown. There was a strong "mochimochi" (chewy) mouthfeel, and the consistency was evaluated as being somewhat less than that of udons b and c.

Udon e (100% fine barley flour C) was soft, and had a mouthfeel that was much more like that of soft rice flour dumplings than that of udon. The opinion that it would be good with black honey was voiced. It had a unique taste that was something like that of buckwheat mash (sobagaki).

Udon f (85% wheat flour, 15% coarse barley flour A) was predominantly brown in color, and brown particles are observed.

Example 4

An SD-BH103 home bakery (Panasonic (Ltd.)) was employed to prepare breads of the compositions indicated below by mixing, fermenting, and baking using the plain bread course. It took about four hours. By the CIE Lab color representation method, the wheat flour employed (bread flour) exhibited an L (luminosity) of 90.39, an a (red-green) of 0.26, and b (yellow-blue) of 9.62. The luminosity was less than that of all-purpose flour. There was a somewhat intense yellow color. Fine barley flour C had greater luminosity than the bread flour. When the two were mixed, the difference in color was almost imperceptible.

TABLE 7

Bread blending proportions

| | Wheat flour bread | Bread containing fine barley flour C (Composition 1) | Bread containing final barley flour (Composition 2) | |
|---|---|---|---|---|
| Bread flour | 250 g | 212 g | 212 g | 15% replacement |
| Fine barley flour | 0 g | 38 g | 38 g | |
| Butter | 10 g | 10 g | 10 g | |
| Granulated sugar | 17 g | 17 g | 17 g | |
| Salt | 5 g | 5 g | 5 g | |
| Water | 180 mL | 190 mL | 200 mL | |
| Dry yeast | 2.8 g | 2.8 g | 2.8 g | |

TABLE 8

Organoleptic evaluation of bread

| Applied food | | Wheat flour | Containing fine barley flour C-1 | Containing fine barley flour C-2 |
|---|---|---|---|---|
| External appearance | Color of crust | Somewhat dull | Bright, charred color | Bright, charred color |
| | Color inside | Pale tea color dominated by yellow | Slightly dull | Pale tea color dominated by yellow |
| | Impression of foreign matter | None | None | None |
| Expansion | | Good | Somewhat poor | Good |
| Final size | | W100 × D100 × H143 | W100 × D100 × H112 | W100 × D100 × H142 |
| Aroma | | Trace smell of yeast | Slight smell of yeast | Trace smell of yeast |
| Taste | | Good | Good | Good |
| Texture | | Fluffy | Mochimochi | Mochimochi |
| Sensation going down | | Good | Good | Good |
| Overall evaluation (deliciousness) | | Ordinary for bread | Highly delicious | Highly delicious |

Since the fine barley flour absorbed moisture well, the amount of water added was increased in the bread containing barley flour relative to the bread containing wheat flour and baking was conducted. For both combinations 1 and 2, the finished bread containing fine barley flour C had a color that was close to bright wheat and was close to the color of bread containing wheat alone. In combination 1, in which the quantity of water added was slightly increased, rising was poorer than in the other breads, but the texture was soft. Combination 2, in which the quantity of water added was greatly increased, rose about the same amount as bread of wheat alone. All had soft textures, came out soft and full, and had good elasticity as bread. In combination 1, to which only a small amount of water was added, there was a somewhat stronger yeast smell than in the other breads. This was attributed to the fact that it did not rise well. The wheat flour bread appeared fluffy. However, breads 1 and 2 containing fine barley flour C both presented a mochimochi sensation. The breads containing fine barley flour C were evaluated as being overwhelmingly better tasting and were preferred to the wheat flour bread.

Example 5

The fine barley flour C of the present invention was blended into commercial (strawberry) yogurt, milk, vegetable juice, and wulong tea. The mixtures were thoroughly mixed and prepared. The compositions and evaluation results are given in Table 9. The same evaluation criteria as in Table 6 were applied to the evaluation items in the table.

TABLE 9

| | | Type of food | | | |
|---|---|---|---|---|---|
| | | (Strawberry) yogurt | | Milk | |
| Type of barley flour | | Fine flour C (present invention) | Coarse flour A | Fine flour C (present invention) | Coarse flour A |
| Blending ratio of barley flour | | 15% | 15% | 15% | 15% |
| External appearance | Color | Pink, unchanged | Pink, unchanged | White turbidity | Somewhat brown |
| | Precipitation | Uniform emulsion | Uniform emulsion with | Uniform emulsion | Emulsion with individual |

TABLE 9-continued

|  | | individual particles | | particles |
|---|---|---|---|---|
| Viscosity | High | High | Low | Low |
| 15% water added, evaluation conducted after adding water | Same viscosity as original yogurt | Same viscosity as original yogurt | No water added | No water added |
| Ease of drinking (eating) | Easy to eat | Easy to eat | Easy to drink | Was rough |
| Aroma | 5 | 5 | 5 | 5 |
| Taste | 5 | 5 | 5 | 5 |
| No sense of lumpiness | 5 | 2 | 5 | 2 |
| Overall evaluation (deliciousness) | 5 | 4 | 5 | 4 |
| Comments | Water could be added to increase quantity | Water could be added to increase quantity | Delicious | Delicious |

| | Type of food | | | |
|---|---|---|---|---|
| | Vegetable juice | | Wulong tea | |
| Type of barley flour | Fine flour C (present invention) | Coarse flour A | Fine flour C (present invention) | Coarse flour A |
| Blending ratio of barley flour | 15% | 15% | 15% | 15% |
| External appearance — Fading | Faded | White turbidity | Slightly brown | Color |
| External appearance — Uniform emulsion | Emulsion with individual particles | Uniform emulsion | Emulsion with individual particles | Precipitation |
| Viscosity | Low | High | Low | High |
| 15% water added, evaluation conducted after adding water | No water added | No water added | No water added | No water added |
| Ease of drinking (eating) | Easy to drink | Somewhat rough | Easy to drink | Was rough |
| Aroma | 4 | 4 | 4 | 4 |
| Taste | 4 | 4 | 4 | 4 |
| No sense of lumpiness | 5 | 2 | 5 | 2 |
| Overall evaluation (deliciousness) | 4 | 3 | 4 | 3 |
| Comments | Easy to drink, no roughness | Roughness | Easy to drink, no roughness | Roughness |

Example 6

A 15% quantity of barley flour was blended into commercial jelly and custard pudding mixes, and jelly and custard were prepared. Coarse flour A was dull in color and produced a perception of foreign matter. However, fine flour C yielded delicious jelly and custard without a sensation of foreign matter.

Barley flour was blended into soymilk in a proportion of 15% and a drink was prepared. With coarse flour A, the color was dull and there was a sensation of roughness. However, fine flour C yielded delicious soymilk without a sensation of roughness.

Barley flour was blended into milk in a proportion of 15% and ice cream was prepared using the usual formula. With coarse flour A, the color was dull and there was a sensation of foreign matter. However, fine flour C yielded delicious ice dream without a sensation of foreign matter.

INDUSTRIAL APPLICABILITY

The present invention is useful in the field of foodstuffs.

The invention claimed is:

1. A method for manufacturing grain flour, the method comprising the steps of:
   milling the starting grain granules to produce a first flour having an average particle diameter of about 150 μm; and
   milling the first flour by airstream crushing of the first flour at a product temperature of 50° C. or lower to produce the grain flour,
   wherein the starting grain granules have not been subjected to an artificial molecular weight reducing enzyme,
   wherein the grain flour is a milled product of grain granules of at least one grain selected from the group consisting of barley and oats,
   wherein an entire quantity of components of starting grain granules is contained in the grain flour, a β-glucan content of the grain flour is 60% to 100% of a β-glucan content of the starting grain granules, wherein the grain flour comprises an average particle diameter falling within a range of 40 to 100 μm, wherein a content of particles with a particle diameter of less than 20 μm is 20 mass % or less, wherein a content of particles with a particle diameter falling within a range of 20 μm to 100 μm falls within a range of 20 to 60 mass %, wherein a content of particles with a particle diameter falling within a range of 100 μm to 500 μm falls within a range of 20 to 60 mass %, wherein a content of particles with a particle diameter greater than 500 μm is 5 mass % or less, and wherein a color difference from white dE is 11 or less.

2. The manufacturing method according to claim 1, wherein the airstream crushing is milling with multiple vortex airstreams.

3. The manufacturing method according to claim 1, wherein the starting grain granules are outer-shell removed grain granules.

4. The manufacturing Method according to claim 1, wherein the β-glucan content of the grain flour is within a range of 4 to 12%.

* * * * *